Aug. 6, 1968 R. NOUEL 3,395,424
METHOD AND APPARATUS FOR MOULDING
Filed June 1, 1966 4 Sheets-Sheet 3

Aug. 6, 1968          R. NOUEL          3,395,424
METHOD AND APPARATUS FOR MOULDING
Filed June 1, 1966                4 Sheets-Sheet 4

United States Patent Office 3,395,424
Patented Aug. 6, 1968

3,395,424
METHOD AND APPARATUS FOR MOULDING
Robert Nouel, Villejuif, Seine, France, assignor to Inventions Finance Corporation, a corporation of France
Continuation-in-part of applications Ser. No. 273,145, Apr. 15, 1963, now Patent No. 3,372,433, and Ser. No. 289,173, June 18, 1963, now Patent No. 3,241,192. This application June 1, 1966, Ser. No. 554,374
1 Claim. (Cl. 18—30)

This invention is a continuation-in-part of my pending applications S.N. 273,145 now U.S. Patent No. 3,372,-433 and 289,173, now U.S. Patent No. 3,241,192.

This invention relates to injection molding and more particularly to a molding transfer and injection arrangement which provides for continuous feeding of the mold material.

Heretofore, in many known plastic injection molding machines, it was necessary to stop the pre-plastification feed screw during injection because there was no place for the plastic or mold material to go after it left the feed screw other than into the injection cylinder or chamber which received the injection piston. Stopping the feed screw had several disadvantages among them the fact that there were created variations in temperature of the mold material which tended to adversely affect the quality of the items being molded. Also, stopping the feed screw slowed down the cyclic molding rate because the mold material was not fed or transferred during the injection part of the operating cycle. Thus by using continuous feed of the mold material, it is possible to overcome the above disadvantages and to obtain feeding of homogenous plastic mold material without deleterious temperature variations.

Another disadvantage of the above mentioned conventional feed screw is the relatively high power required to drive it, the feed screw housing being stationary while the feed screw forced the mold material through the housing and out to the passages leading to the injection cylinder. According to the present invention, an injection feed screw is provided in which the housing for the feed screw is slidably mounted to move as the plastic mold material is fed by the feed screw, the weight and pressure of the mold material reacting against the feed screw to slide the housing and increase the volume of the transfer chamber.

Still another disadvantage of the aforesaid conventional feed screw and its arrangement relative to the injection apparatus was the indirectness and complexity of the various passages which conducted the plastic mold material from the feed screw to the injection chamber. According to the present invention, the feeding passages are extremely simplified and the problems attendant stagnation of mold material is eliminated.

Accordingly, an object of the present invention is to provide a transfer and injection arrangement which provides for continuous feeding of mold material wherein continuous preplasticization, along with even heating and homogeneity of the mold material being fed, are obtained.

Another object is to provide a transfer-injection arrangement for mold material which avoids complex feeding channels or paths, which avoids stagnation of the mold material, and which is of a simplified construction which may be manufactured at relatively low cost.

Another object is to increase the cycling rate of the molding process and at the same time improve the quality of the items being molded.

A further object is to provide a transfer-injection apparatus which provides for continuous pre-plasticization and which is operable with a smaller diameter feed screw requiring less driving power than conventional arrangements of feed screws heretofore known.

A further object is to provide certain improvements in the form, construction, arrangement, and material of the several elements wherein the above-named and other objects may effectively be attained.

Other objects and features of the invention will appear as the description of the particular physical embodiment selected to illustrate the invention progresses.

For a better understanding of the present invention reference should be had to the accompanying drawings wherein like numerals of reference indicate similar parts throughout the several views and wherein.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed is for the purpose of description and not of limitation.

Figure 1:
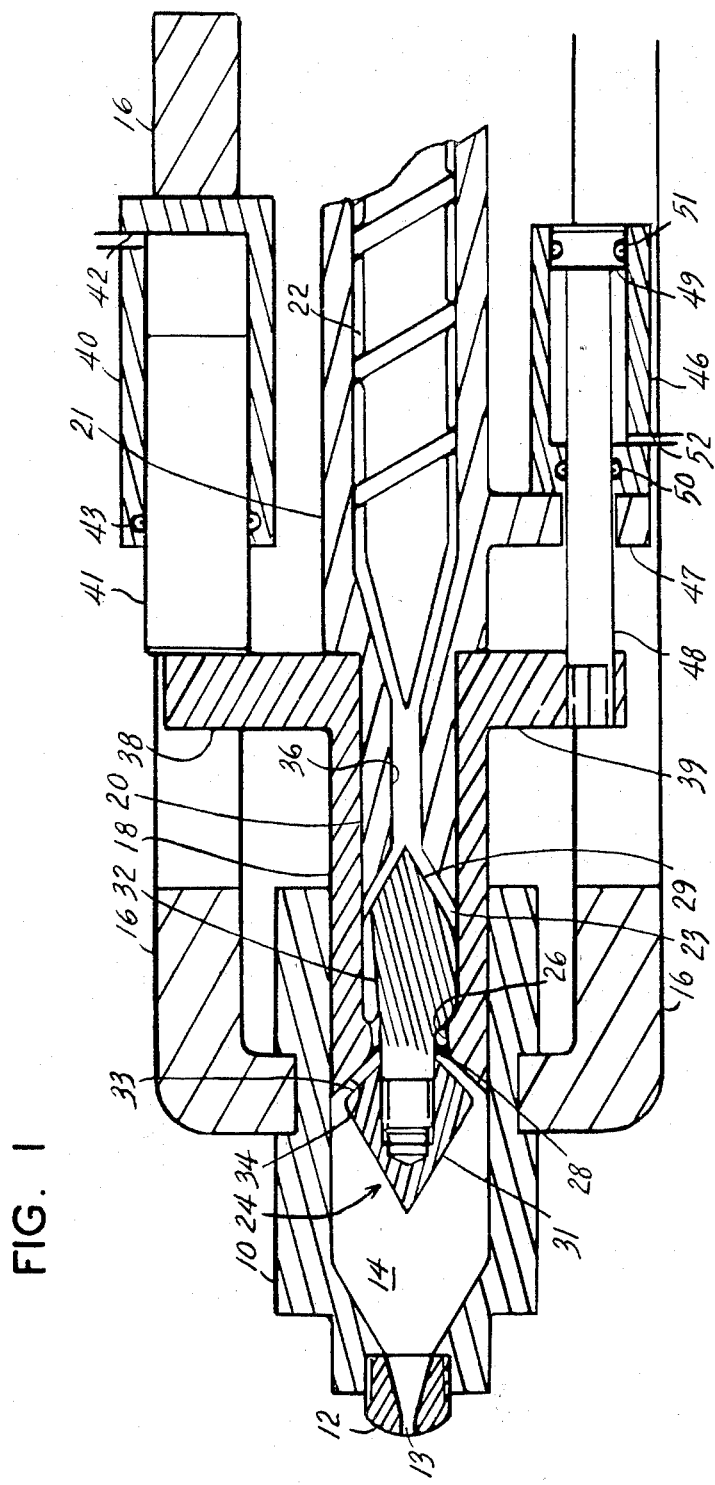
FIGURE 1 is a sectional view of an injection transfer device constructed according to one embodiment of the invention, the parts being shown in a position where the one-way valve is open and mold material has passed into the injection chamber.

Referring to the drawings, FIGURE 1 shows an injection cylinder 10 on which is mounted (e.g. by a threaded engagement) an injection nozzle 12 adapted to abut or engage a mold or other structure (not shown) having a passageway leading to a mold cavity. The injection nozzle 12 has an injection orifice 13 through which the mold material exits from the injection chamber 14 defined by the cylinder 10. The injection cylinder 10 is suitably supported on a support structure or frame 16 (partially shown) of an injection molding machine.

Slidably mounted in the injection chamber 14 is an injection piston assembly comprising an injection piston-collar 18, a sweeping piston 20 which is part of a housing 21 for feed screw 22 and which is in turn slidably mounted in the main bore 23 of the injection piston-collar 18, and a non-return valve indicated generally at 24, slidably carried at least partially, also within the bore 23 of the injection piston-collar 18.

The injection piston-collar 18 has a reduced bore 26 which receives the smaller diameter stem 28 of non-return valve 24, the latter having an enlarged head 29 carried in the main bore 23 of the piston-collar 18 and a closure member 31 projecting into the injection chamber 14. As shown in FIGURE 1, the closure member 31 may be threaded to the stem 28 while the enlarged head 29 may be made integral with the stem 28. The reduced bore 26 will, of course, serve to maintain the non-return valve 24 in its operating positions, the threaded engagement between the stem 28, and closure member 31 facilitating assembly and removal for maintenance and repairs. One or more longitudinal channels 32 at the periphery of the enlarged head 29 insures free communication between the main bore 23 and reduced bore 26 of the piston-collar 18 at all times. As will be evident from FIGURE 1, the rear face 33 of closure member 31 has a conical shape which is adapted to mate with a conical front face 34 at the leading end of piston-collar 18 to preclude flow of mold material between the injection chamber 14 and the bores 23, 26 of piston-collar 18 as will be further described.

The feed screw 22 is adapted to continuously rotate in its housing 21 to feed plastic mold material through the bore 36 in sweeping piston 20, to the main bore 23 in piston-collar 18, through the channel 32 on the head 29 of non-return valve 24, through the reduced bore 28, and thence (if the closure member 31 is unseated) into the injection chamber 14. If the closure member 31 is seated, on the other hand, the mold material will flow from bore 36 of sweeping piston 20 into the main bore 23 of piston-collar 18 where a pressure will be built up to cause the sweeping piston 20 to be withdrawn from the main bore 23 of piston-collar 18, that is, the sweeping piston 20 will be moved to the right (FIGURES 1–4) as the pressure of mold material delivered by the continuously rotating feed screw 22 begins to build up in main bore 23 which has been closed off at its forward end by the seated closure member 31.

The feed screw housing 21 from which the sweeping piston 20 extends is mounted on the frame 16 (by means not shown) for sliding movement so that as the sweeping piston 20 is withdrawn as aforesaid, the screw feed housing 21 and the feed screw 22 (along with its drive, not shown) will slide to various positions (FIGURES 1–4) as will be further described.

The injection piston-collar 18 has one or more wings 38 and 39 adapted to be acted on by one or more power elements. As shown in FIGURE 1 one power element comprises an injection power cylinder 40 mounted on the frame 16, said power cylinder 40 having a piston 41 adapted to engage the wing 38 on piston-collar 18 to urge the latter to the left (FIGURES 1–4). A source of power fluid is admitted to the power cylinder 40 through passage 42, leakage past the piston 41 being prevented by the seal 43.

Another power element comprises an actuator cylinder 46 which, instead of being mounted on the molding machine frame 16 as in the case of the previously described injection power cylinder 40, is mounted to the feed screw housing 21, the mounting being effected by securing the actuator cylinder 46 to a flange 47, extending laterally of the feed screw housing 21. The flange 47 has an opening through which piston rod 48 passes, the latter being secured to the wing 39 of piston-collar 18 as by a threaded engagement. The piston rod 48 is connected to a piston 49 and seals are effected at 50 and 51 to prevent leakage of hydraulic fluid introduced through passage 52.

It will be apparent from the above description that actuator cylinder 46 and piston 48 are operable to provide relative movement between the piston-collar 18 and the sweeping piston 20, that is, the actuator piston rod 48 is operable to force the sweeping piston 20 into the main bore 23 of the piston-collar 18 (compare FIGURES 3 and 4), as will be further described.

Figure 2:
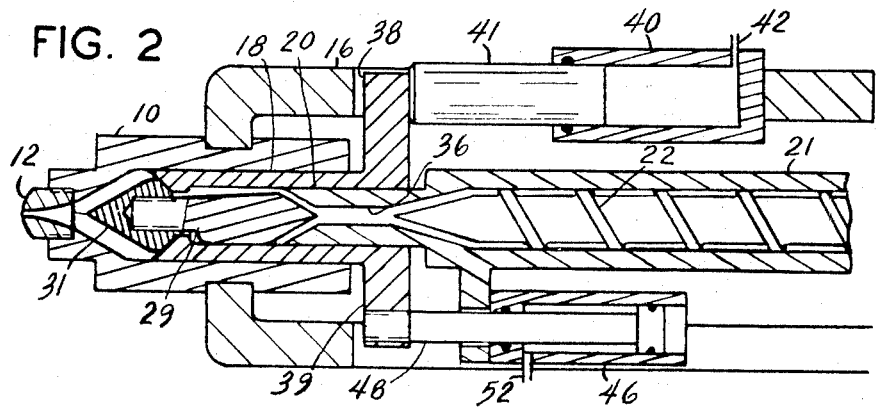
FIGURE 2 is a sectional view similar to FIGURE 1 but showing the parts as they appear upon completion of injection and the beginning of cooling.
Figure 3:
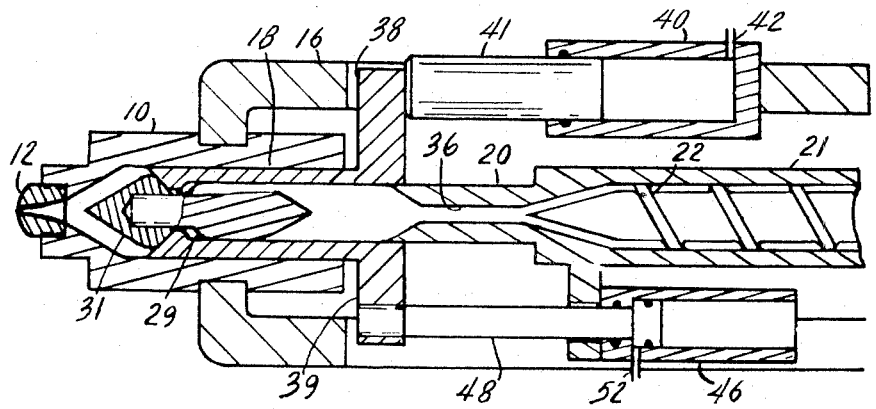
FIGURE 3 is a sectional view similar to FIGURES 1 and 2 but showing the parts as they appear after the transfer chamber has been filled and at the end of the cooling period.
Figure 4:
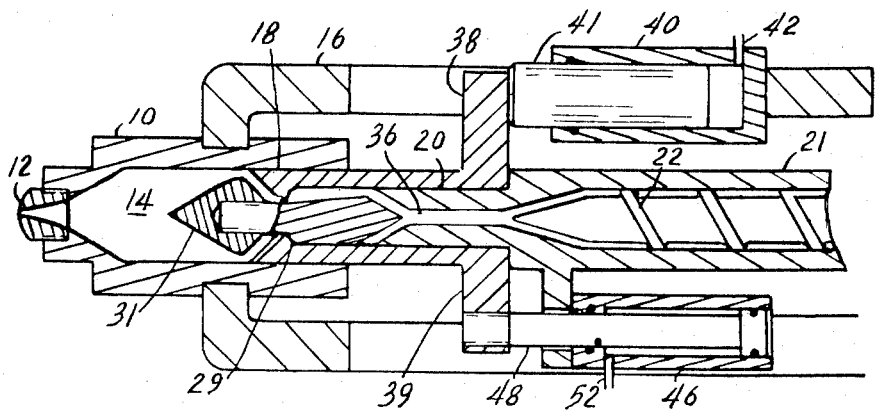
FIGURE 4 is similar to FIGURE 1 and shows the parts as they appear just prior to injection.

Having described the structure shown in the drawings, the operation of the illustrated embodiment will now be set forth. FIGURE 2 shows the position of the various sorts just after injection has been completed, the injection having been effected by admitting power fluid to injection power cylinder 40, the latter moving piston 41 to the left to engage wing 38 and thereby move piston-collar 18 to the left in injection chamber 14 to reduce the volume of injection chamber 14 and force the mold material out through injection orifice 13. During the injection the closure member 31 is seated on surface 33 so that the piston-collar 18 and seated closure member 31 are, in effect, an injection piston, the seating of closure member 31 being obtained due to the relatively large injection pressure developed in the injection chamber 14 as a result of the force applied by the injection power cylinder 40 and piston 41.

Upon completion of injection, the molded object begins to cool in the mold cavity (not shown) prior to its removal. During the cooling period the feed screw continues to deliver mold material into the main bore 23 of piston-collar 18, where the pressure developed in said main bore 23, by the continuously delivered mold material, will force the sweeping piston 20 out of the main bore 23 until the parts assume the position shown in FIGURE 3. During withdrawal of sweeping piston 20 as aforesaid the feed screw housing 21 along with the feed screw 22 (and its drive) will slide to the right (FIGURE 3) as previously described. During this withdrawal of sweeping piston 20, the closure member 31 remains seated, the injection power cylinder 40 being under the pressure of power fluid but the actuator cylinder 46 being exhausted of power fluid via passage 52.

After the cooling period and prior to injection, the mold material in main bore 23 of piston collar 18 is transferred to the transfer cylinder 14. The transfer is effected by admitting power fluid to actuator cylinder 46 via passage 52 whereby the actuator piston rod 48 pushes the piston-collar 18 to the right to the FIGURE 4 position to force the mold material from the main bore 23 of piston-collar 18, to the transfer chamber 14, via channel 32 in the head 29, as the pressure differential unseats the closure member 31. During the transfer power fluid is exhausted from power cylinder 40 via the passage 42. Also, during the transfer of mold material, the feed screw 22 continues to deliver additional mold material and a rapid flow results which passes vigorously and cleans out the various passages. When piston-collar 18 reaches its furthest righthand position (FIGURE 4), the apparatus is ready to commence injection, the latter being effected by admitting power fluid to injection power cylinder 40 while permitting evacuation of power fluid from actuator cylinder 46.

After the piston-collar 18 reaches its furthest righthand position (FIGURE 4), there may be a very brief period of time before actual injection commences. During this brief interval, the sweeping piston 20 may be permitted to slide further to the right to provide space in the main bore 23 of piston-collar 18 to receive mold material from the continuously rotating feed screw 22. If for some reason or other injection does not commence right away, or if for some other reason, the pressure of mold material builds up beyond a predetermined value, a preset pressure responsive device (not shown) may be provided to stop the feed screw. In the normal course of operation, however, the various volumes and other parameters are selected to avoid stoppage of the feed screw.

During injection, power fluid may not be applied to actuator cylinder 46. However, the sweeping piston 20 and feed screw housing 21 advance (i.e., move to the left) with the piston-collar 18 during injection because of the partial vacuum developed in the main bore 23 of piston-collar 18.

Various alternate arrangements may be employed. For example, there may be one or more injection power cylinders equally spaced about a circle to act on the piston-collar 18, the equally spaced plurality of such cylinders serving to distribute the load more evenly around the piston-collar 18. Also, the piston-collar 18 may be advanced by other power means, for example, by mechanical devices. Also the relative movement between the piston-collar 18 and feed screw housing 21 may be effected in various other arrangements of hydraulic and/or mechanical devices.

Figure 5:
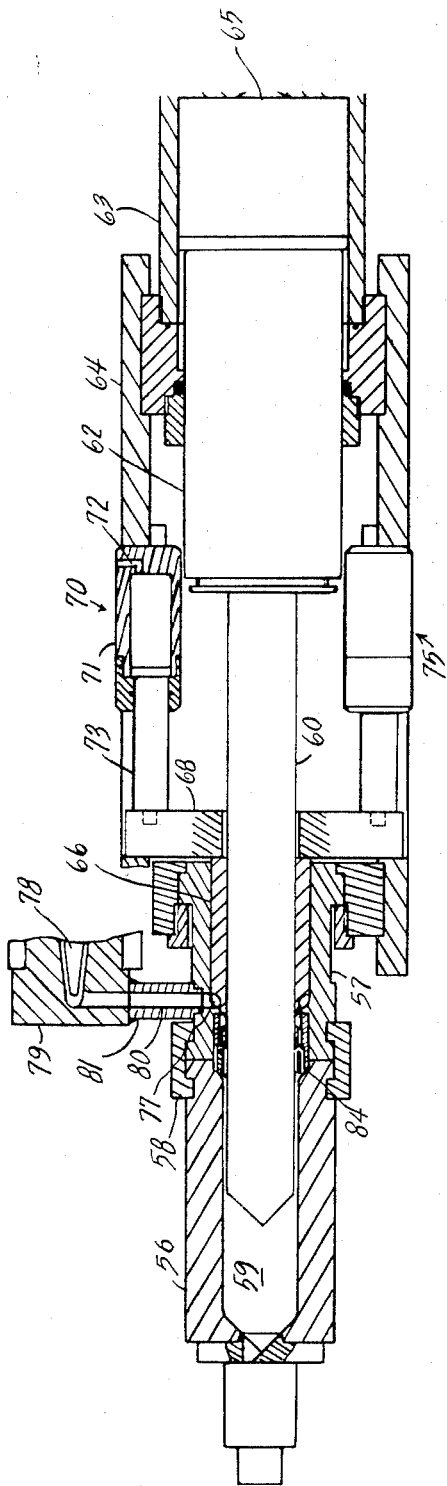
FIGURE 5 is a sectional view of an alternate embodiment, showing an injection transfer device with the parts shown in position where the injection piston is advancing.
Figure 6:
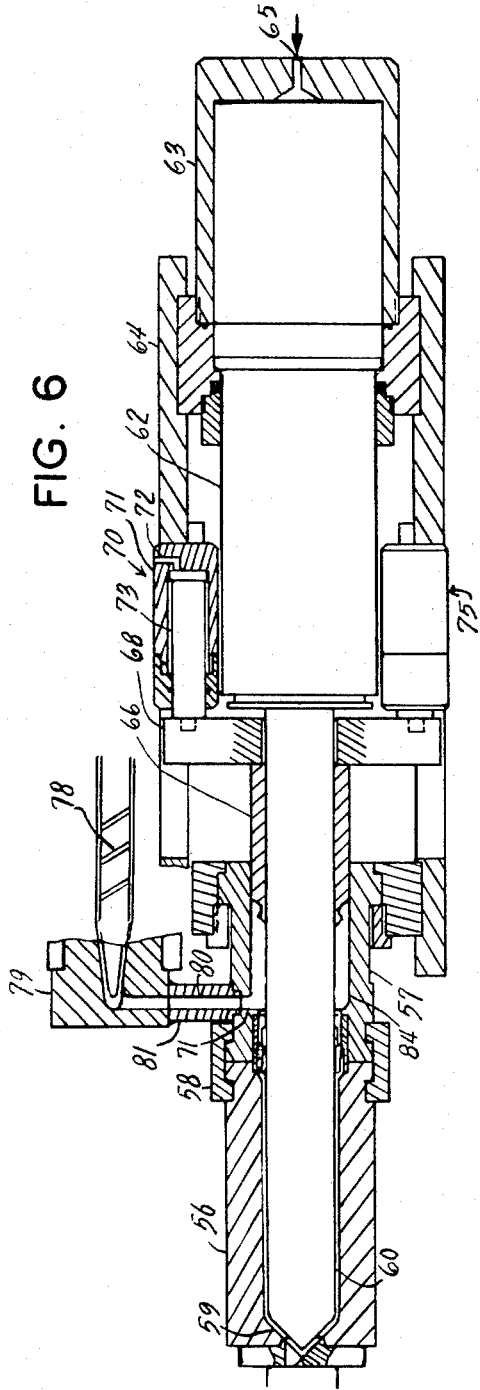
FIGURE 6 is a sectional view similar to FIGURE 5 but showing the parts as they appear upon completion of injection.
Figure 7:
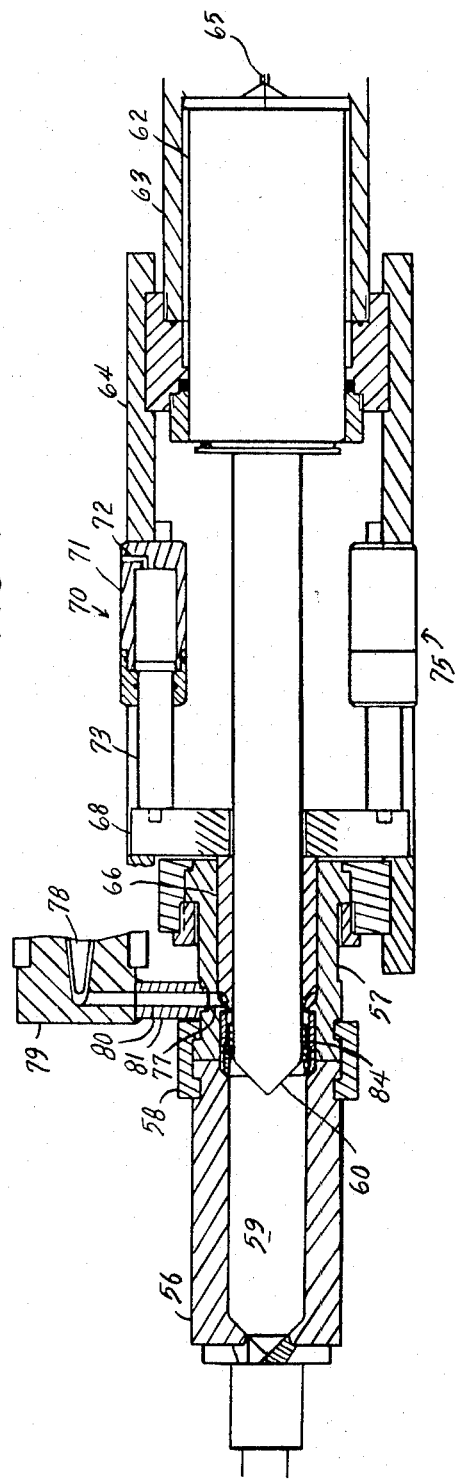
FIGURE 7 is a sectional view similar to FIGURES 5 and 6 but showing the parts as they appear just before injection commences.

FIGURES 5 to 7 show an alternate embodiment in which the feed screw is coaxially displaced from the injection chamber, the latter in turn being in coaxial alignment with the injection power cylinder. This embodiment comprises an injection cylinder 56 having a bore defining an injection chamber 59, a housing 57 in coaxial alignment, and a connector (e.g. threaded) 58 joining the two parts 56 and 57 together. Slidably mounted in the injection cylinder 56 and housing 57 is an injection piston 60, the latter being operated by a power piston 62 operating within a power cylinder 63 which is supplied with power fluid through the passage 65. The power cylinder 63 is suitably supported on a support structure or frame 64 (partially shown) of an injection molding machine.

Slidably mounted in the housing 57 and around injection piston 60 is a collar 66, the latter being movable to various positions (compare FIGURES 5 and 6). The collar 66 has a lateral flange 68 projecting beyond the power piston 62 where there are one or more actuating power cylinders operable to engage the flange 68 and slide the collar 66 in and out of the housing 57. One of the actuating power cylinders, indicated generally at 70, comprises a cylinder 71 having a passage 72 for power fluid, a piston 73 in the cylinder 71 and operable to engage and move the flange 68 and collar 66 as will be further described. A second actuating power cylinder, indicated generally at 75, is constructed and operates in a similar manner and hence will not be described in detail.

The housing 57, previously described, has a passage 77 receiving mold material discharged from an extrusion screw 78 operating within its housing 79 (partially shown). It will be apparent that the mold material discharged from the screw 78 passes downwardly through the passage 80 in connecting member 81 to the passage 77 in housing 57.

Having described the structure shown in FIGURES 5 to 7, the operation thereof will now be set forth. FIGURE 5 shows the position of the parts during injection, the injection piston 60 being in an intermediate position of its injection stroke. During injection, power fluid is, of course, applied to power cylinder 63 via passage 65. During injection as the injection piston 60 passes into the injection chamber 59, the various feed passages (e.g. 77, 80) for the mold material leading from the extrusion screw 78 are isolated or sealed off from the injection chamber 59 by the close fit of the injection piston 60 in the injection cylinder 59. In other words, the mold material in passages 77 and 80 are not subjected to injection pressure. As the injection piston 60 advances to complete its stroke (FIGURE 6), the extrusion screw 78 continues to deliver mold material. While the injection piston 60 is in the bore of injection cylinder 56, the mold material continuously delivered by the extrusion screw 78 is delivered to a transfer chamber (indicated by numeral 84 in FIGURE 6), the latter increasing in volume as the collar 66 is withdrawn. Thus, with the power fluid free to exhaust from the actuator power cylinders 70 and 75, the mold material delivered by the feed screw 78 will pass through passage 77 in housing 57 and since it cannot enter the injection chamber 59 (because the injection piston 60 is in the latter as previously described) the delivered mold material will act against the collar 66 to cause the latter to withdraw (i.e., move to the right as shown in FIGURE 6).

After the injection stroke is complete and the injection piston 60 has returned to its withdrawn position (FIGURE 7), the mold material from the extrusion screw 78 is free to pass into the injection chamber 59 because the bore in the housing 57 is larger than the diameter of the injection piston 60 thereby leaving an annular space through which the mold material can pass from the passage 77 or transfer chamber 84 into the injection chamber 59.

With the injection piston withdrawn as shown in FIGURE 7, power fluid is applied to the actuating power cylinders 73 and 75, the latter acting on the flange 68 and forcing the collar 66 into the housing 57, thereby decreasing the volume of the transfer chamber 84 and forcing the mold material from the latter into the injection chamber 59. During this transfer, mold material continues to be fed by the extrusion screw 78 to pass into the injection chamber 59 along with the mold material being transferred. After the mold material has been transferred, injection may commence by applying power fluid to the injection cylinder 63. As the injection piston 60 enters the bore of injection cylinder 56, the continuously delivered mold material will pass into transfer chamber 84 to force withdrawal of the collar 66 as previously described.

It will be apparent from the above that the extrusion or feed screw 78 may be operated continuously.

The invention hereinabove described may be varied in construction within the scope of the claim, for the particular device selected to illustrate the invention is but one of many possible embodiments of the same. The invention, therefore, is not to be restricted to the precise details of the structure shown and described.

What is claimed is:

1. An apparatus for injection molding comprising a feed means including a conveyor and a relatively movable collar surrounding the conveyor, said collar having an outlet of reduced diameter, a variable volume transfer chamber defined by the outlet of said collar and the bore of a hollow movable piston means wherein the volume of said chamber is varied by relative movement of said collar within the piston bore, a variable volume injection chamber defined by the movable piston means and an injection nozzle wherein the volume is varied by movement of the piston and a valve extending in the passage between the piston means and the injection chamber, said valve being closed during injection.

References Cited
UNITED STATES PATENTS

| | | | |
|---|---|---|---|
| 2,616,130 | 11/1952 | Banz | 18—30 |
| 2,950,501 | 8/1960 | Harkenrider | 18—30 |
| 3,020,591 | 2/1962 | Breher et al. | 18—30 |
| 3,089,192 | 5/1963 | Adams | 18—30 |
| 3,169,275 | 2/1965 | Compton et al. | 18—30 |

WILBUR L. McBAY, *Primary Examiner.*